US006841950B1

(12) United States Patent
Walker (10) Patent No.: US 6,841,950 B1
(45) Date of Patent: Jan. 11, 2005

(54) DIMMABLE ELECTROLUMANESCENT LAMP DRIVERS AND METHOD THEREFOR

(75) Inventor: James T. Walker, Palo Alto, CA (US)

(73) Assignee: Supertex, Inc., Sunnyvale, CA (US)

( * ) Notice: Subject to any disclaimer, the term of this patent is extended or adjusted under 35 U.S.C. 154(b) by 0 days.

(21) Appl. No.: 10/677,452

(22) Filed: Oct. 2, 2003

(51) Int. Cl.[7] .................................................. G09G 3/10
(52) U.S. Cl. .............................. 315/169.3; 315/209 R; 315/291; 315/312; 315/DIG. 4; 323/218; 323/233
(58) Field of Search ........................ 315/169.3, 209 R, 315/291, 307, 312, DIG. 4, DIG. 7, 360; 323/212, 218, 222, 233, 241, 283

(56) References Cited

U.S. PATENT DOCUMENTS

| | | | | |
|---|---|---|---|---|
| 5,336,978 A | * | 8/1994 | Alessio ..................... | 315/169.3 |
| 5,418,434 A | * | 5/1995 | Kamens et al. .......... | 315/169.3 |
| 5,861,719 A | * | 1/1999 | Koskowich et al. .... | 315/209 R |
| 6,011,382 A | * | 1/2000 | Littlefield et al. ......... | 323/222 |

* cited by examiner

Primary Examiner—Haissa Philogene
(74) Attorney, Agent, or Firm—Jeffrey D. Moy; Harry M. Weiss; Weiss, Moy & Harris, P.C.

(57) ABSTRACT

A method for dimmable control of a multiple output EL lamp driver is disclosed. The multiple output EL lamp driver has a power converter. A plurality of EL lamps are provided wherein one terminal of each EL lamp is coupled to a single common terminal. A plurality of half bridge circuits are provided wherein each circuit has an output impedance. One half bridge circuit is coupled to the single common terminal and each remaining terminal of each EL lamp is coupled to a separate individual half bridge circuit. A logic circuit is coupled to each of the half bridge. An oscillator is coupled to the logic circuit. The method comprises: minimizing the output impedance of the half bridge circuit coupled to the single common terminal to prevent to brightness crosstalk between EL lamps; selecting output impedances of remaining half bridge circuits to produce rounded waveforms across terminals of the EL lamps; and manipulating a drive waveform of one of the plurality of EL lamps to control brightness.

23 Claims, 13 Drawing Sheets

MULTIPLE OUTPUT EL LAMP DRIVER

PHASE SHIFTED DRIVE WAVEFORMS

FIG. 1 (PRIOR ART)

A) SQUARE WAVE DRIVE

B) HIGH EFFICIENCY DRIVE

FIG. 2 (PRIOR ART)

FIG. 3 MULTIPLE OUTPUT EL LAMP DRIVER

FIG. 4 PHASE SHIFTED DRIVE WAVEFORMS

FIG. 5 LAMP BRIGHTNESS vs SERIES RESISTANCE Rs
F=500 Hz  19×50mm LAMP

FIG. 6 LAMP POWER vs SERIES RESISTANCE
F=500 Hz  19×50 mm LAMP

FIG. 7 LAMP EFFICIENCY vs SERIES RESISTANCE
F = 500 HZ   19 x 50 mm LAMP

FIG. 8 LAMP BRIGHTNESS vs DUTY FACTOR
Vcx = +120  F = 500 HZ  19x50 mm LAMP

FIG. 9 LAMP POWER vs DUTY FACTOR
Vcx = +120  F = 500 HZ  19x50 mm LAMP

FIG. 10 LAMP EFFICIENCY VS DUTY FACTOR

FIG. 11 AVERAGE FREQUENCY CONTROL

FIG. 12 METHOD 2 - BRIGHTNESS
F = 500 HZ   19 X 50 mm LAMP
RS = 3.3 KΩ   3/4 : DUTY PULSES

FIG. 13 METHOD 2 EFFICIENCY

FIG. 14 METHOD 2 BRIGHTNESS VS Vcx
F=500Hz  19×50mm LAMP
RS=3.3K  3/4 : 1/4 DUTY PULSES

FIG. 15 METHOD 2 EFFICIENCY VS Vcx
F=500Hz  19×50mm LAMP
RS=3.3K  3/4 : 1/4 DUTY PULSES

FIG. 16 LAMP BRIGHTNESS VS Vcx
F=500 HZ  19 x 50 mm LAMP

FIG. 17 LAMP EFFICIENCY VS Vcx
F=500 HZ  19 x 50 mm LAMP

FIG. 18 VARIABLE TRANSITION RATE PHASE CONTROL

FIG. 19A DIMMABLE EL DRIVER PROTO

Fig. 19B

DIMMABLE ELECTROLUMANESCENT LAMP DRIVERS AND METHOD THEREFOR

BACKGROUND OF THE INVENTION

1. Field of the Invention

This invention relates to electrolumanescent (EL) lamps and, more specifically, to a dimmable electrolumanescent lamp driver.

2. Description of the Prior Art

Electrolumanescent (EL) lamps are basically capacitors that contain a phosphor so that a light is given off when a displacement current flows. Because of this, the light output of a particular lamp is to a first order directly dependent on the product of the operating voltage and frequency, and to a lesser extent on the waveshape being used to drive the lamp. As a matter of convenience, most integrated circuits generate an approximately square waveshape for driving the two lamp electrodes with a constant peak-to-peak voltage. The brightness of an EL lamp is greater if the square wave voltage applied to the lamp has a finite rise and fall time of 5% or more of the operating wave period. Higher efficiency operation is obtained if during the wave transition from one polarity to the opposite, the lamp terminals are shorted to each other first to partially discharge the lamp capacitance. Otherwise, the current required for the discharge comes from the high voltage power source and causes wasted energy.

Control of the EL lamp's brightness may be implemented by providing a mechanism to vary the lamp drive voltage or the lamp operation frequency. However, circuits to control the brightness of an EL lamp have many drawbacks. For example, brightness control by drive frequency is limited in the minimum brightness which it can produce. Furthermore, many EL lamp drivers do not allow controlling the brightness of multiple EL lamps.

Therefore, a need existed to provide an improved EL lamp driver. The improved EL lamp driver must be able to overcome the problems associated with the prior art EL lamp drivers.

SUMMARY OF THE INVENTION

In accordance with one embodiment of the present invention, it is an object of the present invention to provide an improved EL lamp driver.

It is another object of the present invention to provide an improved EL lamp driver that is able to overcome the problems associated with the prior art EL lamp drivers.

BRIEF DESCRIPTION OF THE PREFERRED EMBODIMENTS

In accordance with one embodiment of the present invention a method for dimmable control of a multiple output EL lamp driver is disclosed. The multiple output EL lamp driver has a power converter. A plurality of EL lamps are provided wherein one terminal of each EL lamp is coupled to a single common terminal. A plurality of half bridge circuits are provided wherein each circuit has an output impedance. One half bridge circuit is coupled to the single common terminal and each remaining terminal of each EL lamp is coupled to a separate individual half bridge circuit. A logic circuit is coupled to each of the half bridge. An oscillator is coupled to the logic circuit. The method comprises: minimizing the output impedance of the half bridge circuit coupled to the single common terminal to prevent to brightness crosstalk between EL lamps; selecting output impedances of remaining half bridge circuits to produce rounded waveforms across terminals of the EL lamps; and manipulating a drive waveform of one of the plurality of EL lamps to control brightness.

The foregoing and other objects, features, and advantages of the invention will be apparent from the following, more particular, description of the preferred embodiments of the invention, as illustrated in the accompanying drawing.

DETAILED DESCRIPTION OF THE PREFERRED EMBODIMENT

Figure 1:
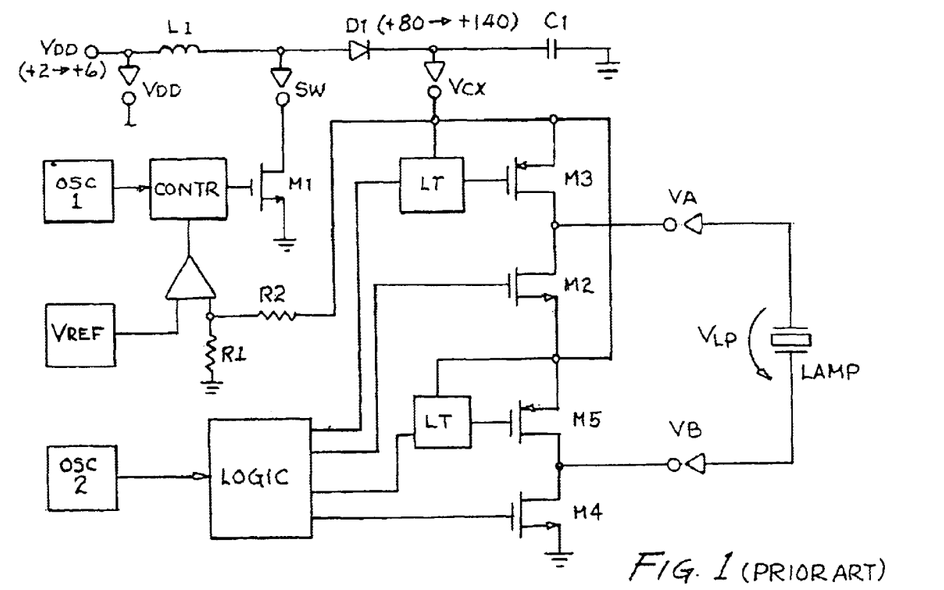
FIG. 1 is a simplified functional block diagram of a prior art integrated circuit EL lamp driver.

FIG. 1 shows a functional block diagram of a prior art integrated circuit EL lamp driver 10 having a square wave output. The driver performs two main functions. The first is conversion of the incoming low voltage power to a high voltage for the EL lamp. The second is conversion of the high voltage DC power to high voltage AC power for the EL lamp. Incoming power typically is in the range of +2 to +6 volts from a low impedance source such as a battery. Conversion to high voltage is done by using the switch M1 to periodically short one end of the inductor L1 to ground with the other end tied to the input power $V_{DD}$. The switch operation frequency is determined by the oscillator OSC1. When the short to ground of the inductor L1 is removed, the inductor L1 tries to maintain it's current, resulting in a voltage pulse to a high voltage at the switch terminal. Diode D1 conducts the peak voltage to the capacitor C1, thereby transferring the energy stored in the inductor L1 into the capacitor C1. The capacitor C1 stores the high voltage DC that will be used to power the EL lamp. The developed high voltage is typically +80 to +140 volts. An optional part of the power converter is a voltage divider and a source of reference current, which are used with a comparator C to determine if the voltage $V_{cx}$ has reached a desired value. When this value is attained, the comparator C turns off a control circuit so that the switch M1 stops pulsing. This action regulates the developed voltage $V_{CX}$ at the desired operating value regardless of the amount of power being used by the EL lamp.

Conversion of the DC high voltage $V_{CX}$ to high voltage AC to drive the EL lamp is done by a bridge arrangement of four high voltage switching transistors M2, M3, M4, and M5. These are used to generate two oppositively phased square waves at $V_A$ and $V_B$, giving a larger waveform as the difference voltage applied to the EL lamp. Control of the bridge switches M2, M3, M4, and M5 is done at a rate determined by oscillator OSC2, with a logic circuit LOGIC to generate the proper phase controls for the bridge switches M2, M3, M4, and M5. Since the gate voltage of the PMOS transistors M3 and M5 in the bridge is relative to the voltage $V_{CX}$, each PMOS transistor M3 and M5 is driven by a voltage level transistor LT.

Figure 2:
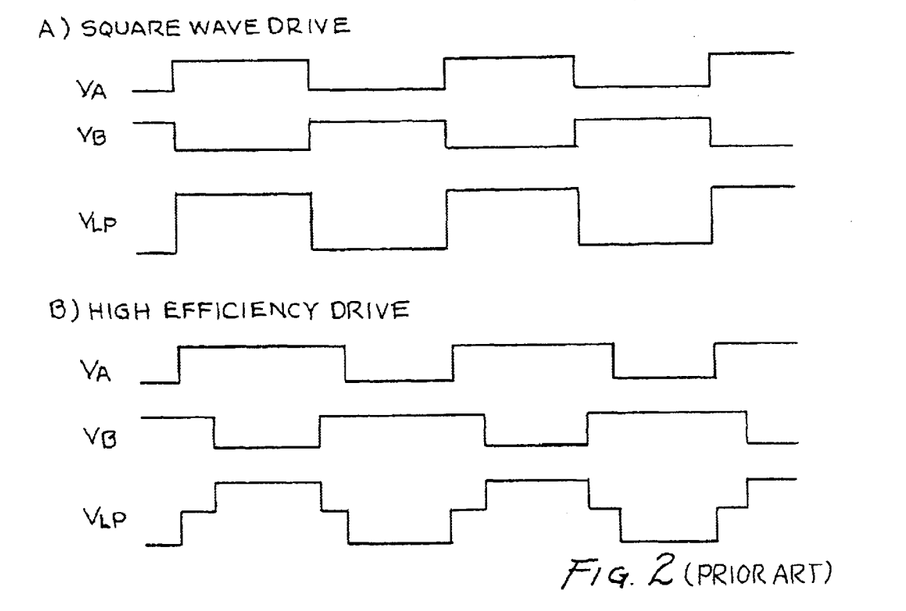
FIG. 2 shows two of the possible waveforms that may be generated by the EL lamp driver of FIG. 1.

FIG. 2 shows two of the possible waveforms that may be generated. In FIG. 2A, the voltages at $V_A$ and $V_B$ are both square waves with a 50% duty cycle, so that their difference is also a square wave of twice the amplitude and 50% duty cycle. The difference voltage $V_{LP}$ has twice the peak-to-peak amplitude of the voltage at $V_A$ and $V_B$ but a similar shape. In FIG. 2B, the voltages at $V_A$ and $V_B$ are changed so that they spend more time at the positive level than at the negative level. Alternatively, the voltages could spend more time at the negative level than at the positive level. The result is a more complicated waveform as shown for $V_{LP}$ with approximately one fourth of each half cycle being spent at the zero difference condition. This operating mode is referred to as the high efficiency drive condition. Additional logic is required to create the waveforms of FIG. 2B, and oscillator OSC2 may have to operate at a four times higher frequency. The square wave driven operation mode is simpler to create as the PMOS transistor on one side of the bridge may be driven by the same signal as the NMOS transistor on the other side.

Control of the EL lamp's brightness in FIG. 1 may be implemented by providing a means to vary the lamp drive voltage or the lamp operation frequency. For a single lamp controlled by a single integrated circuit one may simply vary the reference voltage $V_{REF}$ or the ratio of resistors R1 and R2 to change the effective voltage applied to the EL lamp, or vary the operating frequency of the oscillator OSC2. However, if the oscillator OSC2 frequency is made too low, the EL lamp can be seen to visibly flicker. The EL lamp puts out a pulse of light for each alteration of its terminal voltage, so a square wave drive at 500 HZ produces 1000 pulses of light per second. On this basis, the minimum drive frequency for the EL lamp is approximately 30 Hz, giving a flicker frequency of 60 Hz. Brightness control by drive frequency variation is thus limited in minimum brightness which it can produce by the flicker effect.

Figure 3:
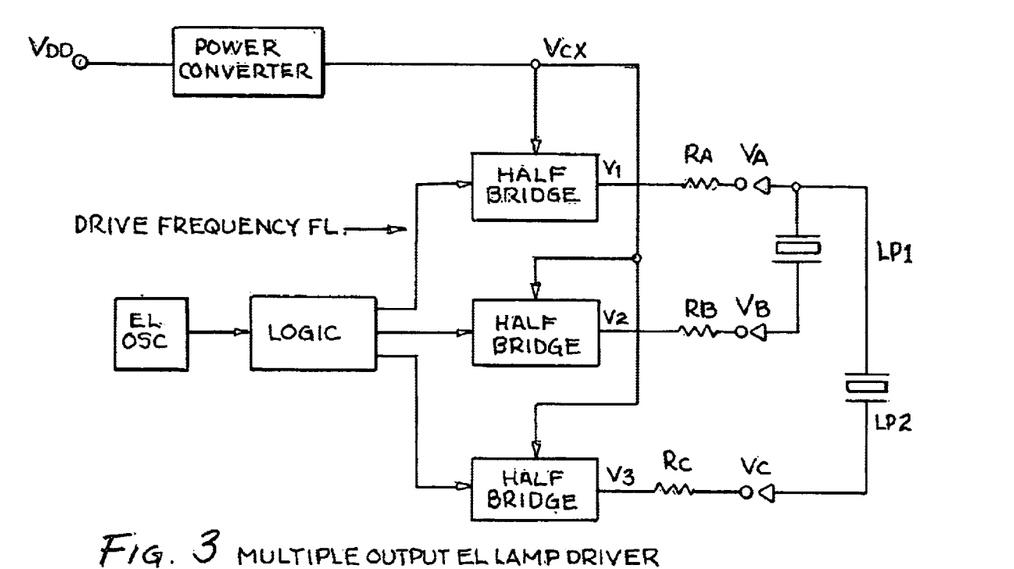
FIG. 3 is a simplified functional block diagram of a multiple output EL lamp driver.

An integrated circuit intended to drive more than one EL lamp at a time would have a circuit similar to that in FIG. 1, except that it would need additional high voltage half-bridge output switches as used to generate $V_A$ or $V_B$. If one additional switch set is added to produce an additional voltage $V_C$, then the simplified block diagram of FIG. 3 results. In this circuit, a power converter produces the high voltage $V_{CX}$ as before, and each terminal of an EL lamp is driven by a half bridge. In a system with two or more lamps, it may be convenient to reduce the package pin count by connecting one side of all the EL lamps to a single common terminal. In FIG. 3, this common terminal is $V_A$. Since all EL lamps now share a high voltage supply $V_{CX}$ and a common drive frequency FL, variation of either of those parameters cannot be used to individually dim the EL lamps. Resistors RA through RC represent the output impedance of the half bridge driver plus any additional parasitic or internal resistor elements.

The brightness of an EL lamp is proportional to the product of the effective drive voltage $V_E$ and the average transition rate FA. Thus, any control method which varies one or more of these parameters can provide individual dimming. Below, two methods will be described which involve variation of either the effective drive voltage or the average transition rate. High efficiency operation of the EL lamp drive is still obtainable for these cases with the proper choice of drive waveform. The waveforms of FIG. 2B could be used, but individual dimming would not be possible.

Figure 4:
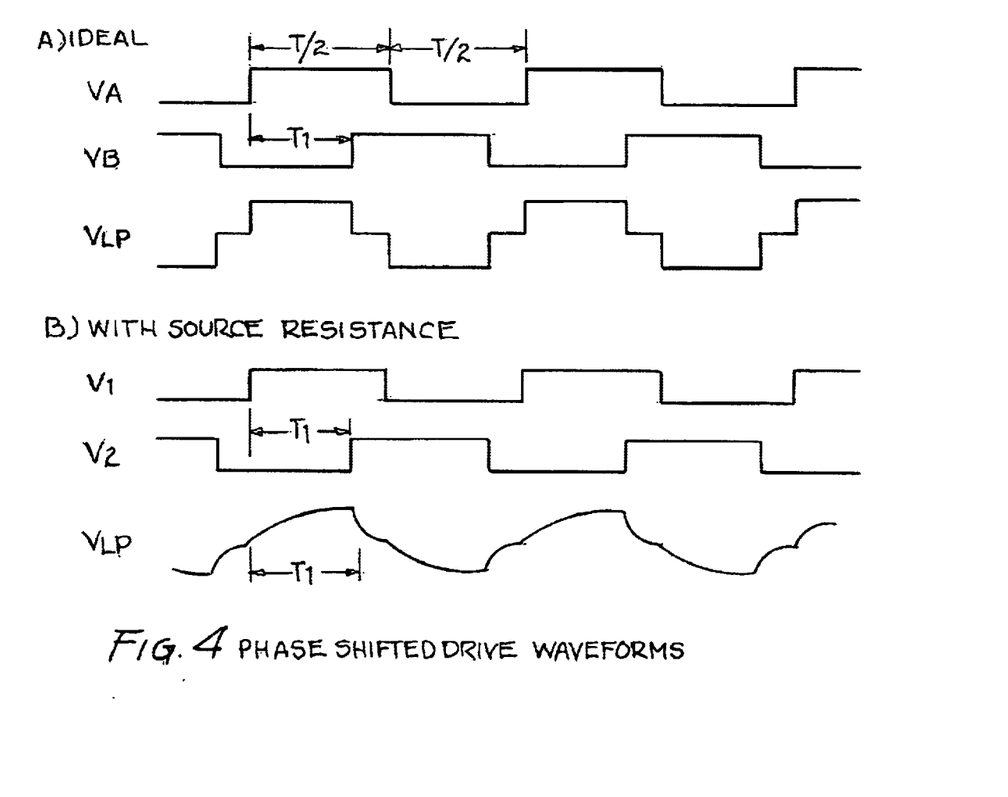
FIG. 4 shows possible waveforms that may be generated by the EL lamp driver of FIG. 3.

Recall that high efficiency operation of an EL lamp requires that the terminal voltage of the EL lamp is zero for some portion of each half cycle, so that part of the discharge energy when changing lamp terminal polarities is not drawn from the high voltage power source. This requirement was met in FIG. 2B by using asymmetrical drive voltages for $V_A$ and $V_B$ so that for some period of time in each half cycle, both VA and VB were at the same voltage level. Another method of meeting this requirement is to use a set of drive voltage waveforms as shown in FIG. 4A. Here $V_A$ is the same as in FIG. 2A, and $V_B$ is the waveform of FIG. 2A with a phase delay. As a result, the difference waveform $V_{LP}$ is now as shown in FIG. 4, and is in fact the same waveform as shown previously in FIG. 2B. If we designate the EL lamp waveform period as time T, then each half cycle takes time T/2. The time T1 is the phase delay between $V_A$ and $V_B$, producing the active time when voltage is applied. Now we see that the active time may be varied independently for each EL lamp output by separate variation of the time Ti for the half bridge outputs $V_B$ and $V_C$ of FIG. 3. The half bridge output $V_A$ is kept constant as the time reference.

In the system of FIG. 3, the half bridge drivers typically have a non-zero output impedance represented by RA, RB, and RC respectively. Therefore, the ideal voltages shown as $V_A$ and $V_B$ in FIG. 4A are really the voltages $V_1$ and $V_2$ in FIG. 3. The resulting voltages are shown in FIG. 4B. Here $V_A$ and $V_B$ have been replaced with $V_1$ and $V_2$, and the lamp waveform $V_{LP}$ is seen to have rounded corners on its transition. The waveshape at terminals $V_A$ and $V_B$, is more complex, but not important to the overall operation. If the driver $V_A$ is feeding a common terminal for several lamps, its internal resistance $R_A$ needs to be small in comparison to the separate lamp resistances $R_B$, $R_C$, etc. to prevent brightness change crosstalk. The most important feature of the lamp waveform $V_{LP}$ in FIG. 4B is that the peak voltage reached during the active time $T_1$ now depends on the value of the time $T_1$ due to the rounded waveshape. A secondary factor in the lamp brightness is the slope of the lamp voltage waveform.

Figure 5:
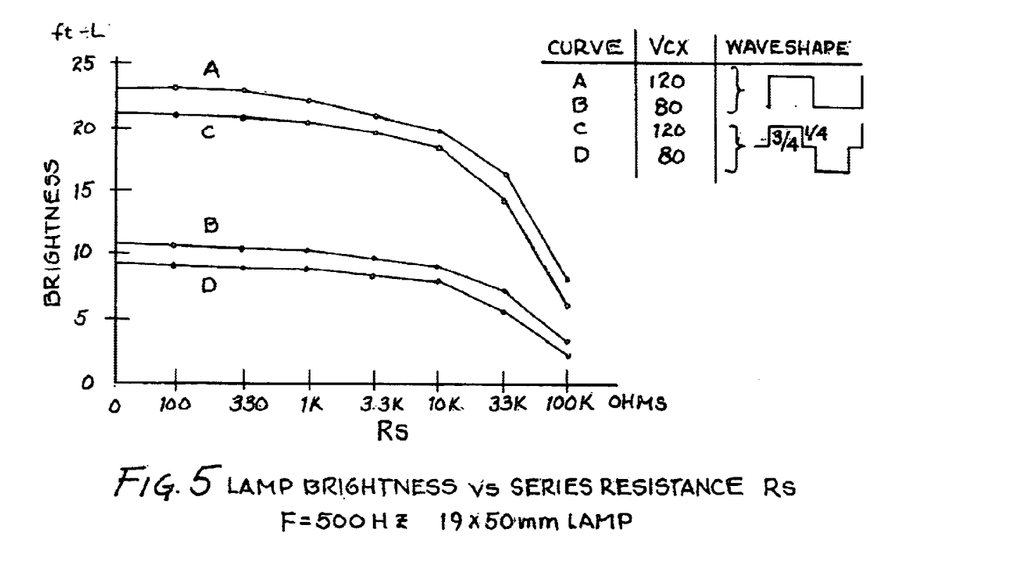
FIG. 5 is a chart showing EL lamp brightness versus series resistance for the EL lamp driver of FIG. 3.
Figure 6:
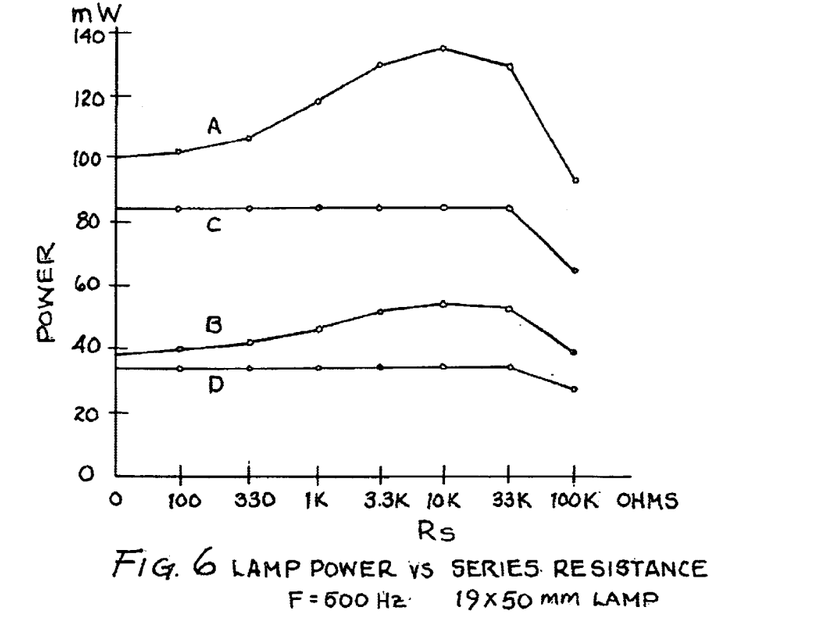
FIG. 6 is a chart showing EL lamp power versus series resistance for the EL lamp driver of FIG. 3.
Figure 7:
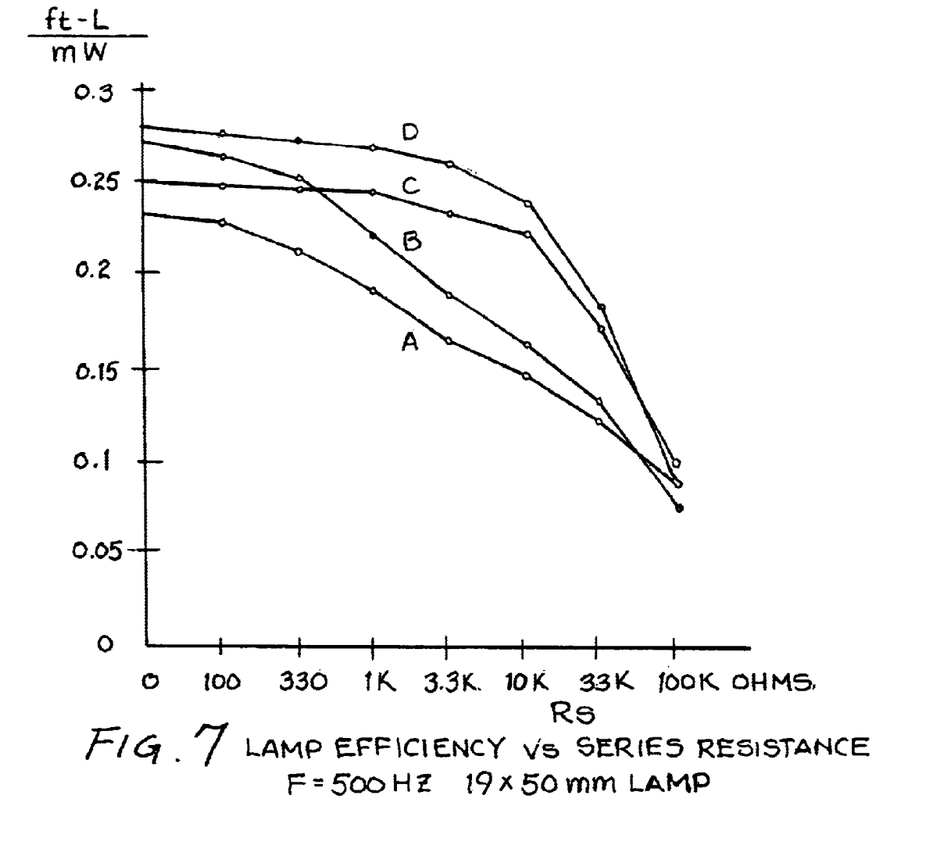
FIG. 7 is a chart showing EL lamp efficiency versus series resistance for the EL lamp driver of FIG. 3.

Consider a single lamp system such as lamp $L_{P1}$ in FIG. 3 with series resistance $R_A$ and $R_B$. Choose that $R_A << R_B$ so that $R_B$ determines the time constant in the lamp circuit. The lamp itself may be modeled as a capacitor, so the lamp capacitance together with the series resistance $R_B$ determine the time constant for the waveform $V_{LP}$ in FIG. 4B. Variation of this time constant affects the dV/dT and peak voltage as seen at the lamp terminals, having some effect on the average lamp brightness. FIG. 5 shows the typical results for a lamp measuring 19 mm by 50 mm in size with a 50% duty cycle square wave drive. At low values of series resistance the sharp waveform edges seem to reduce the light output, and at large values of series resistance the waveform curvature limits the peak voltage attained, again limiting output. In addition, there is an undesired shift in the lamp color at low series resistance values towards an actinic blue instead of the original lime green. FIG. 6 shows the lamp power consumption measured as the product of the average DC current-output of the power converter and voltage $V_{CX}$. The waveforms are the standard and high efficiency square wave drives of FIG. 5. With the standard square wave, power consumption is affected by the additional series resistance, whereas with the high efficiency waveform the average power consumption is not greatly affected by the series resistance value, except to fall of at high resistance values. Finally, dividing the two sets of data above, the lamp efficiency as arbitrarily defined as the light output divided by the power input is plotted in FIG. 7.

Figure 8:
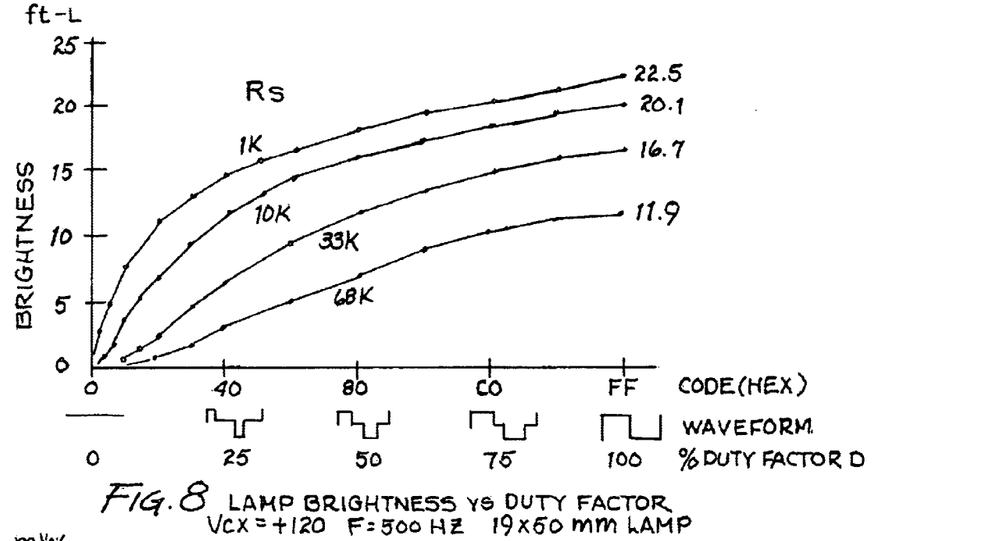
FIG. 8 is a chart showing EL lamp brightness versus duty factor for the EL lamp driver of FIG. 3.
Figure 9:
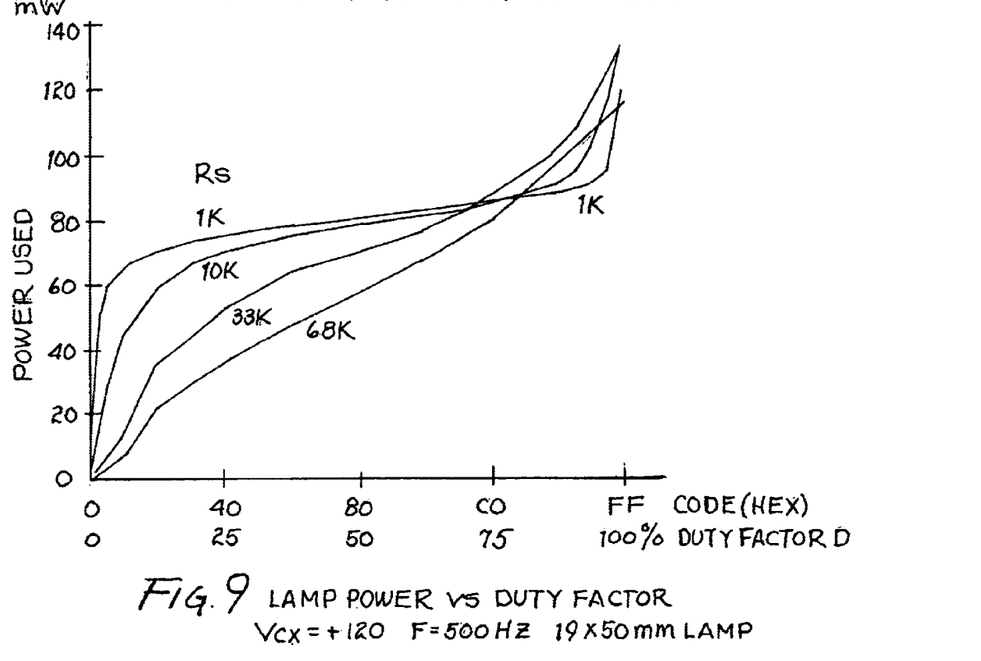
FIG. 9 is a chart showing EL lamp power versus series resistance for the EL lamp driver of FIG. 3.
Figure 10:
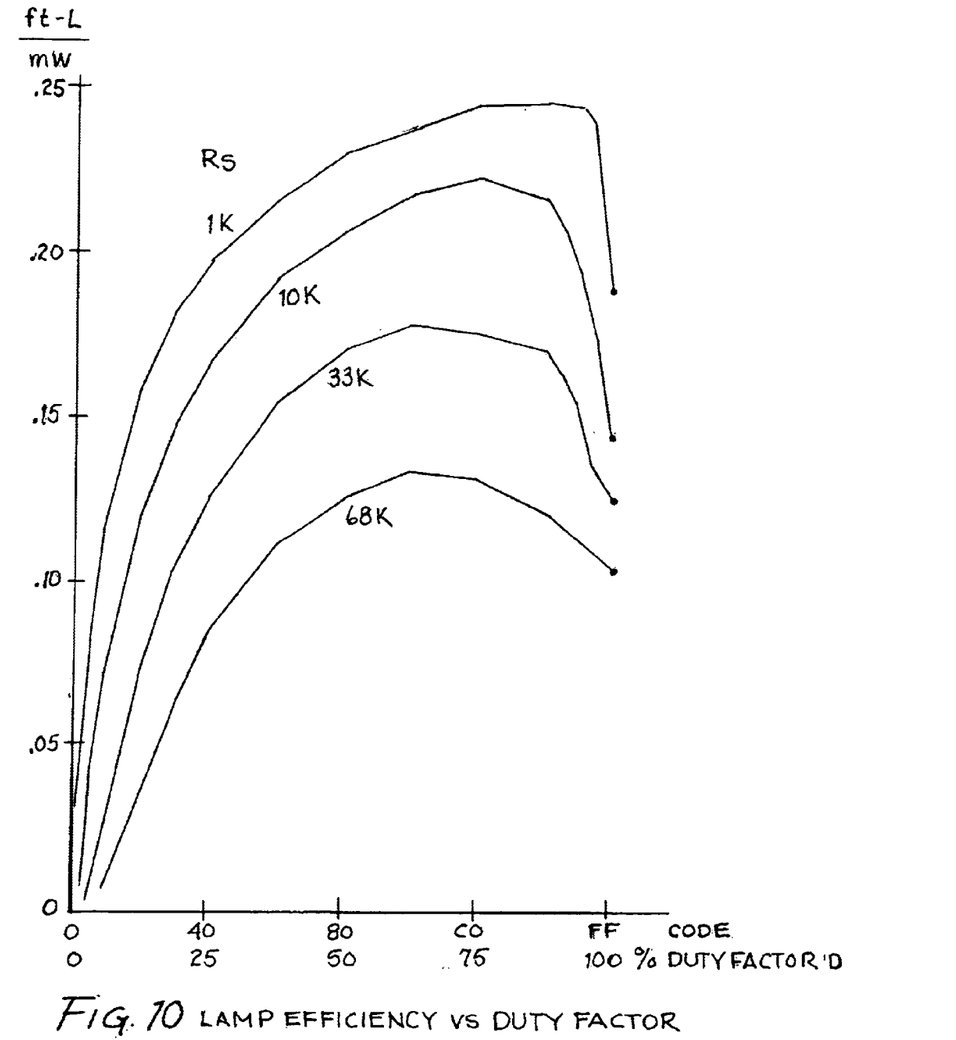
FIG. 10 is a chart showing EL lamp efficiency versus duty factor for the EL lamp driver of FIG. 3.

Define the waveform duty factor in FIG. 4A as D=T1 divided by the half cycle time T/2. This is the portion of each half cycle when the waveform is not zero. FIG. 8 shows how the average lamp brightness varies with the duty factor D for different values of series resistance RB and a constant drive voltage $V_{CX}$ of 120 volts. Note that D=75% corresponds to the high efficiency drive case shown previously in FIGS. 2B and 4. It is seen that the lamp brightness is affected more linearly by the duty factor if the series resistance is larger, and that for the smallest series resistance the lamp brightness is only slightly affected by duty factor except at very small values. Also, when the duty factor is small the lamp color shifts undesireably towards blue as before. FIG. 9 shows the lamp power consumption as a function of the duty factor D. When the duty factor goes toward 100%, the lamp power consumption goes up due to part of the lamp discharge energy coming from the $V_{CX}$ power supply. If the duty factor is reduced enough, the discharge energy is dissipated in the series resistance $R_B$ instead, reducing the load on the power converter. Combining the date from FIGS. 8 and 9 gives the overall lamp efficiency as function of duty factor D as shown in FIG. 10. For suitably chosen series resistance values, the efficiency variation is acceptable over the duty factor range.

It is now possible to use the curves of FIG. 8 together with the curves of FIG. 10 to choose a value of resistor to use for $R_B$. A resistor value of 33,000 ohms in series with the lamp give a nearly linear brightness variation with duty factor D, while still give good efficiency from the curves of FIG. 10. A resistance value of 10,000 ohms give better efficiency, but the brightness steps at the low levels will be greater due to the greater non-linearity.

Now the system for continuous variation of the brightness of group of EL lamps with a common drive terminal as in FIG. 3 can be specified. The series resistance of the common driver output $R_A$ needs to be minimized to prevent brightness crosstalk between the lamps in the system. The series resistance $R_B$, $R_C$, etc. for the separate drive terminals of the lamps $L_{P1}$, $L_{P2}$, etc. are chosen such that they produce a rounded waveform across the lamp terminals. Then the individual lamp drive waveforms are delayed by a phase shift time T1. The lamp brightness will increase as T1 increases from 0 to the full half cycle time T/2. With a suitable choice of resistance, an acceptable value of maximum lamp brightness and efficiency are obtained, and the lamp brightness will vary in a continuous manner when the phase shift parameter T1 for each output is varied. Since the lamps have independent drive outputs for their phase shifted terminals, the lamp brightness control functions are independent. The time delay function T1 could be implemented in either an analog or digital manner, with the resulting value of T1 being controlled by external inputs to the integrated circuit.

Since the lamp drive frequency is typically 500 Hz, analog timer circuits integrated entirely in an IC could require an awkward combination of capacitance values, resistances, and current sources. For modern processes, the preferred embodiment is a circuit using entirely digital counter techniques. As an example, the original EL oscillator could operate at a frequency such as 512 times the desired EL output frequency, allowing an 8 bit counter to divide the waveform half cycle into 256 parts. Then an eight bit control value could set the time delay value T1 to one of 256 different values, giving a perceptibly fine control to the lamp brightness setting. Consider the data presented previously at a $V_{CX}$ supply voltage of +120 volts with a series resistance of 33,000 ohms. The lamp produces minimal light output for delay codes less than 8, with an increasing output for greater values. Since power consumption occurs for codes greater than zero, the efficiency curve lags behind at the start. Also, for codes greater than about C0 hex, the high efficiency operation regime is exited, an the power consumption increases at a faster rate than the light output, causing an efficiency drop. This design gives a good compromise between efficiency, controllability, and light output for a system that allows a fine degree of independent brightness of the several EL lamps connected to a single integrated circuit driver. Use of a 10,000 ohm series resistance will give about 20% greater light output and corresponding better efficiency, but with substantially poorer control characteristics. The series resistor could be left to the user's discretion as a discrete element external to the integrated circuit.

Consider again the multiple output EL lamp driver system of FIG. 3. If instead of controlling the relative phases of all output cycles of a lamp driver half bridge as discussed in FIG. 4B, a few cycles could have their relative phase varied to be either of two values. As long as the pattern of control to the lamp drive voltages repeats at a rate of at least 60 Hz or more, there will be negligibly apparent flicker in the lamp brightness. With a basic lamp drive frequency of 500 Hz for example, then the pattern could repeat with a period of up to eight drive cycles.

Figure 11:
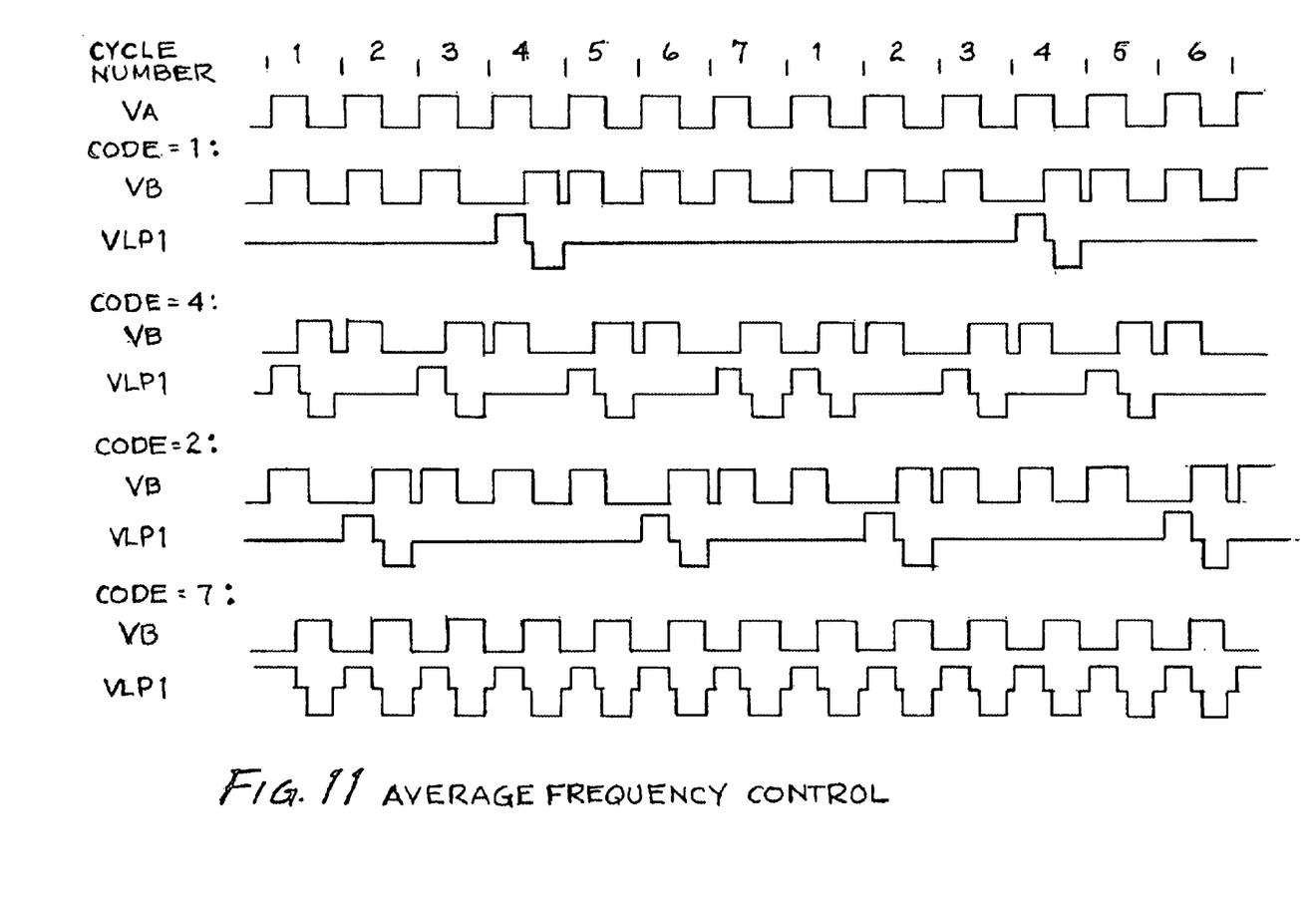
FIG. 11 is a chart showing average frequency control for the EL lamp driver of FIG. 3.

FIG. 11 shows an example of a lamp cycle gating scheme for implementing the above idea. In this case it is chosen to divide the basic lamp drive frequency by seven to produce a repeating pattern of zero to seven pulses which will drive the EL lamp. This pattern will repeat at a frequency of 71.4 Hz, so that flicker will not be perceptible. The lamp cycles in the pattern are assigned a cycle number of 1 through 7. The choice of seven divisions is made so that a three bit binary number may be used to control the number of active cycles in each pattern. The VA drive voltage for the common electrode connection is driven with a 50% duty cycle square wave at 500 Hz. During each numbered cycle, the separate EL lamp electrode such as $V_B$ is driven with either the same square wave as used for $V_A$, or a similar square wave delayed by a time of ⅜ of a cycle. When the delayed wave is used, the difference waveform takes on the shape of the high efficiency waveform presented previously in FIGS. 2B and 4. Assign the binary control bits to represent a code number from 0 to 7. Code 0, for all bits low, obviously represents the case of the lamp being off, and the $V_B$ waveform is identical to $V_A$. Code 1 can be chosen to cause one of the seven cycles to have a delayed waveform on $V_B$, producing an average lamp frequency of 71.4 Hz. In the case shown, code 1 causes cycle 4 to have a delayed waveform for $V_B$. Note that when a partial number of cycles is generated, they always have both positive and negative portions, so the lamp average (DC) voltage is essentially zero. Code 2 causes two of the seven cycles of the pattern to have delayed waveforms for $V_B$, so the lamp receives power for 2/7 of the time in the patter. Also, the two cycles that are chosen for code 2 are numbers 2 and 6, which will not interfere with the use of cycle 4 for code 1. Finally, code 4 turns on cycle numbers 1, 3, 5 and 7. If code 1 is the least significant bit (LSB) of the three bit binary control number, code 2 is the next significant, and code 4 is the most significant bit (MSB) of the binary number, then the binary brightness input code may be directly used to gate the various cycle positions of the pattern. Thus the three bit binary input directly controls the brightness of the EL lamp over range of seven to one, plus off. In this case, since each of the cycles generated is the same, the lamp brightness will be close to linear function of the input control bits.

Figure 12:
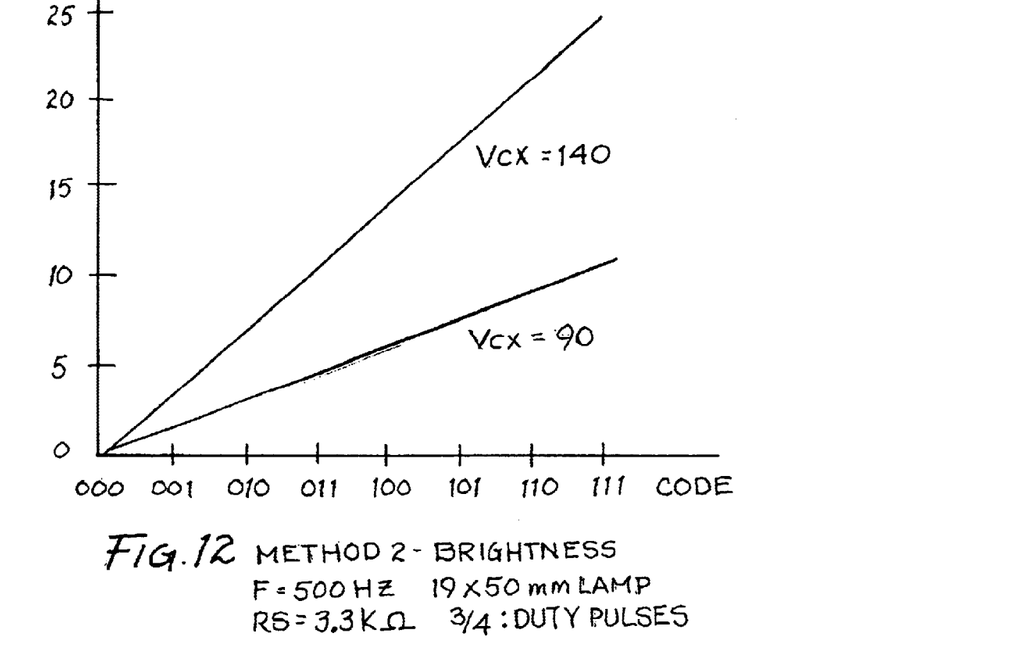
FIG. 12 is a chart showing EL lamp brightness versus binary codes for the EL lamp driver of FIG. 3.
Figure 13:
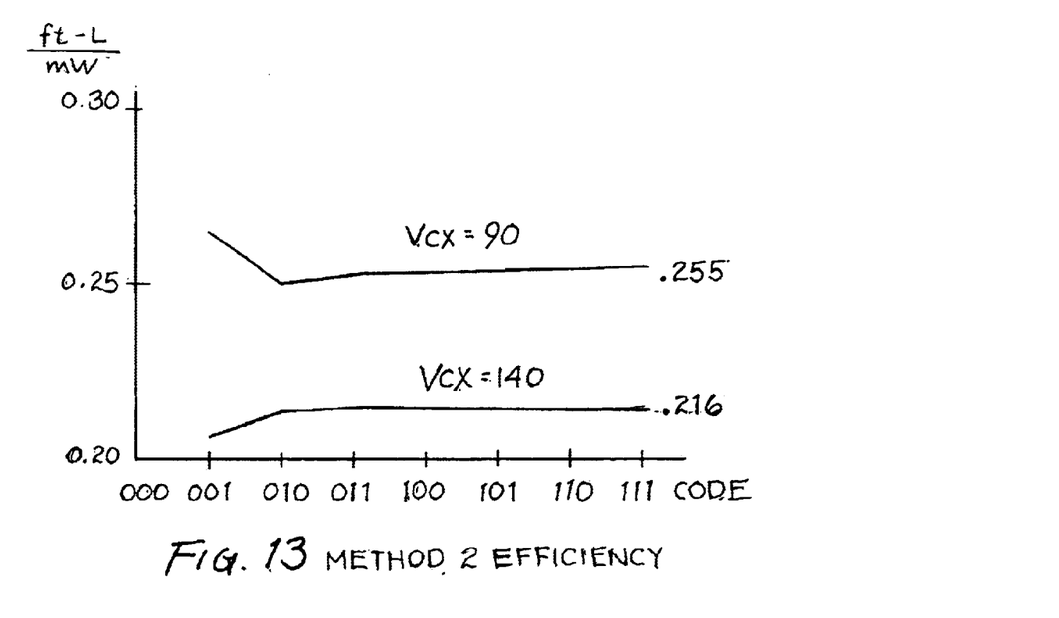
FIG. 13 is a chart showing EL lamp efficiency versus binary codes for the EL lamp driver of FIG. 3.
Figure 14:
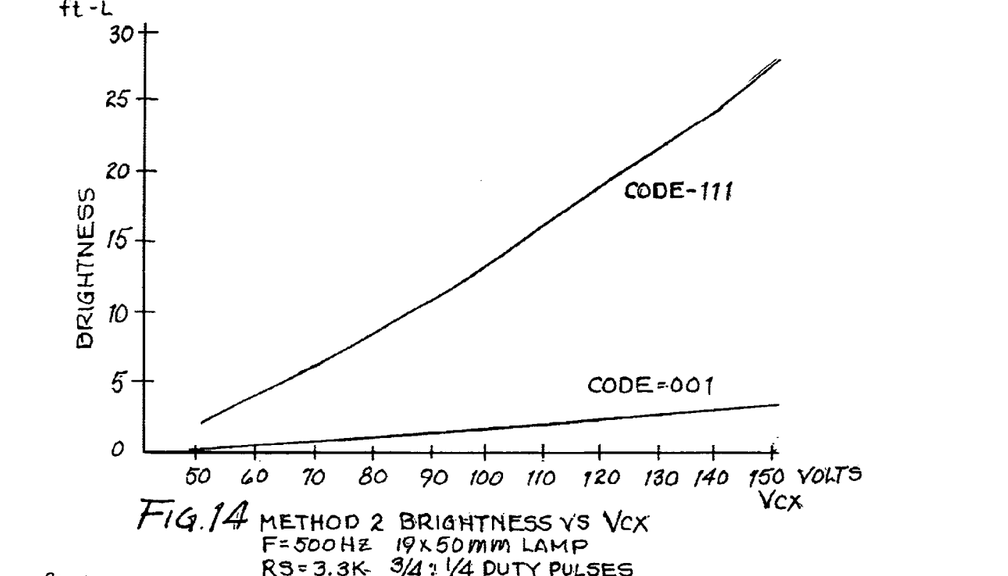
FIG. 14 is a chart showing EL lamp brightness versus voltage for different binary codes for the EL lamp driver of FIG. 3.
Figure 15:
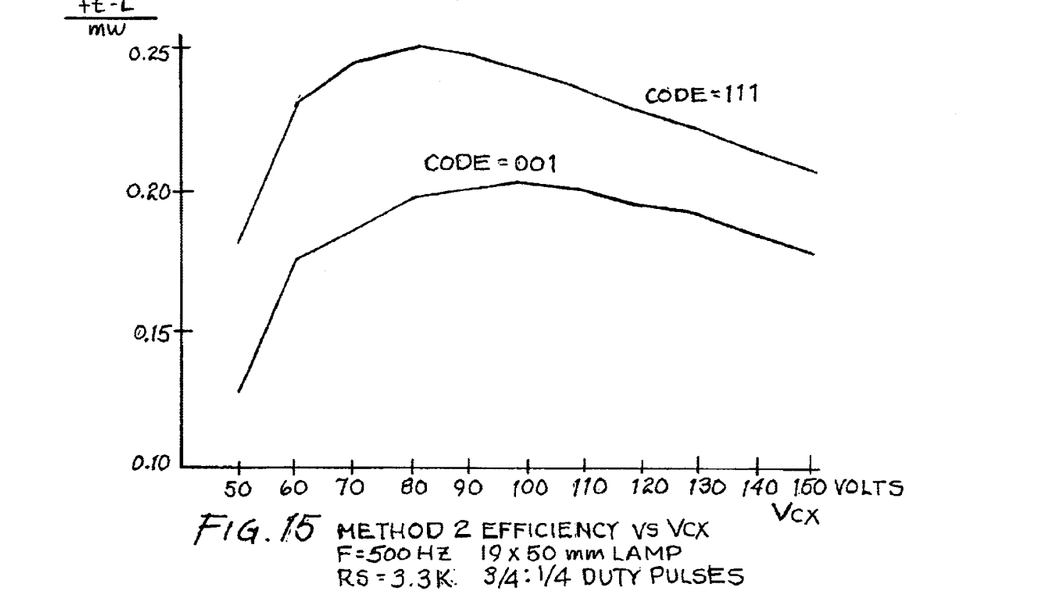
FIG. 15 is a chart showing EL lamp efficiency versus voltage for different binary codes for the EL lamp driver of FIG. 3.

FIG. 12 shows measured data for the lamp brightness of an EL lamp driver using the previously mentioned lamp. An operation frequency of 500 Hz and $V_{CX}$ voltages of +140 volts and +90 volts were used in this case with a series resistor $R_B$ of 33,000 ohms. It is seen that the lamp brightness is a linear function of the control code. FIG. 13 shows the corresponding efficiency, which is nearly constant over the brightness range. This control method will give independent control of the brightness of several EL lamps connected to an integrated circuit driver with a common output connection. FIG. 14 gives detailed information on the variation of lamp brightness with the supply voltage $V_{CX}$ for the two operating cases of code=001 and 111. Lamp brightness is approximately proportional to the applied voltage in this case. The corresponding efficiency curves are given in FIG. 15. Note that the efficiency for the code 001 case is similar to the code=111 case, so the dimming operation did not seriously affect operation.

Figure 16:
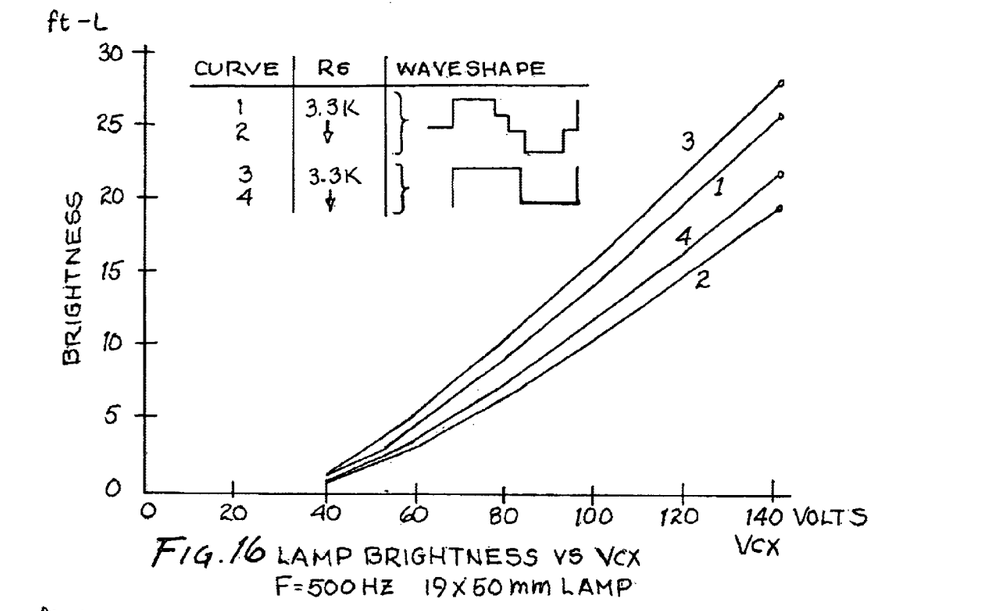
FIG. 16 is a chart showing EL lamp brightness versus voltage for the EL lamp driver of FIG. 3.
Figure 17:
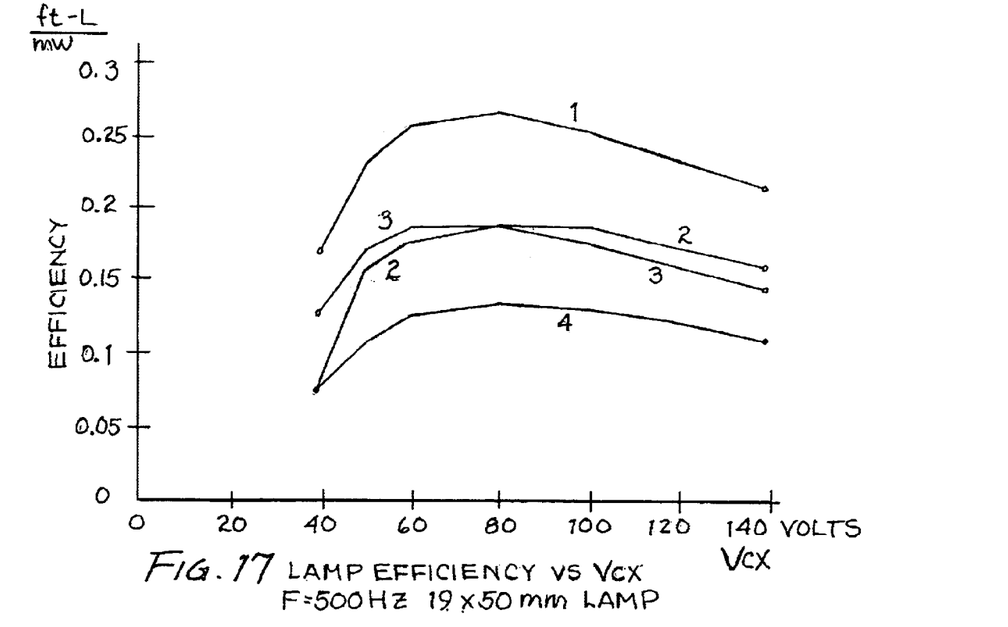
FIG. 17 is a chart showing EL lamp efficiency versus voltage for the EL lamp driver of FIG. 3.

The effect of the lamp waveform for this mode of operation is shown in FIGS. 16 and 17 for two values of series resistance. The most efficient method of operation is seen to be the case with 3,300 ohms of series resistance and the high efficiency waveform style, with only a small penalty in maximum brightness. Both of these curves are done for control code of 111, causing lamp drive on every cycle at 500 Hz. These curves are also relevant to operation for the first method, corresponding to a phase shift duty cycle of either 75% or 100%.

The amount of circuitry required to add one channel to the system of method 2 is substantially less than that required for the continuous phase shift generation discussed for method 1. Method 2 requires only a few gates and a single flip flop, whereas method 1 requires a presettable digital down counter to generate the delay time. The main disadvantage of method 2 is the limited number of brightness values that may be generated, and the fact that the minimum brightness value is 14% of the maximum value. To the human eye, which has a basically logarithmic response, this is not a very large brightness variation. Also, since method 2 gives only seven different brightness values, changes from one brightness level to another are readily perceived. Method 1 allows a much greater number of brightness levels, limited mainly by the amount of digital logic which one may desire to use in the integrated circuit implementation. The eight bit implementation discussed above give enough brightness levels so that changes are imperceptible except near extinction, and the extinction brightness level is much lower than the maximum brightness level. Both the implementations discussed above may be operated in a regime that gives best operating efficiency for the EL lamp conversion to AC power.

Figure 18:
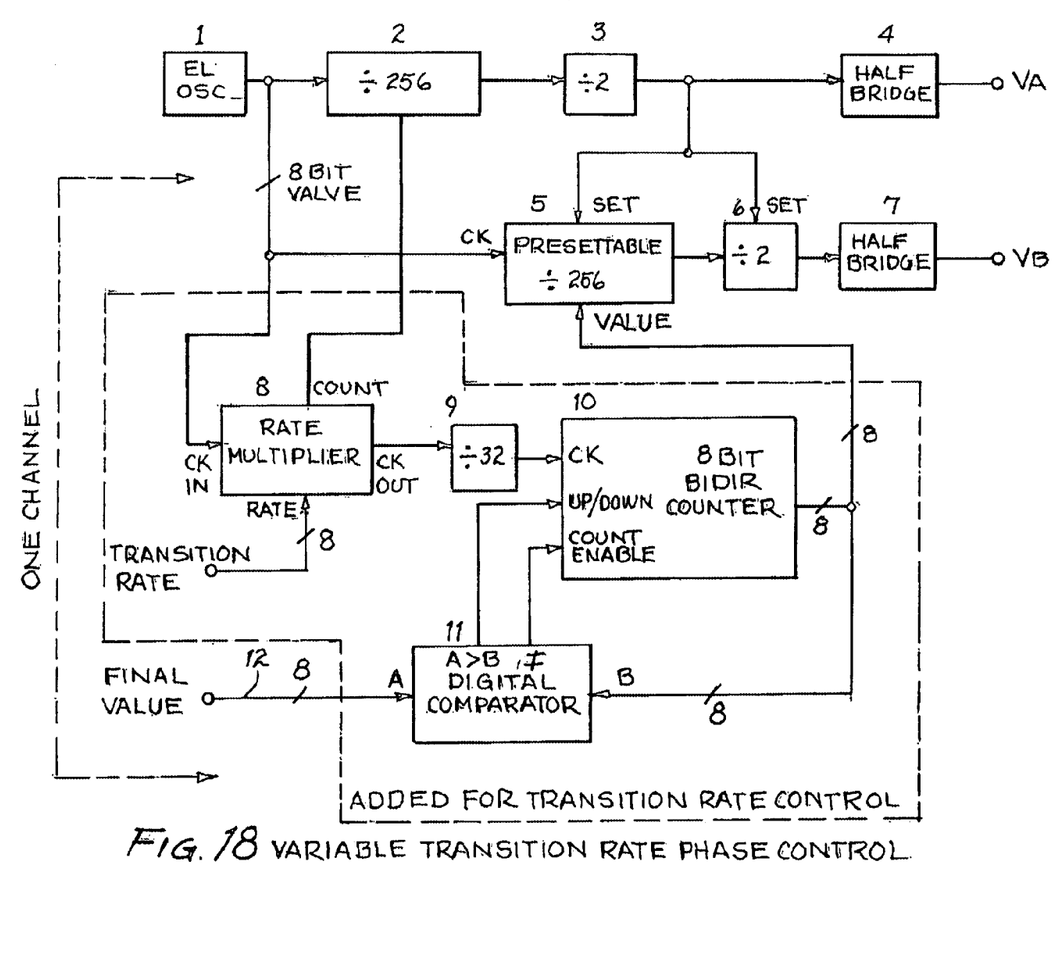
FIG. 18 is a simplified functional block diagram of a variable transition rate phase controller.

An additional advantage of using method 1 is that since the brightness variation can have more steps, it is possible to add additional logic so that the brightness may be made to vary gradually between set points. The rate of variation may be set with an additional counter and a digital rate multiplier. FIG. 18 shows the block diagram of a single channel that implements this additional feature and provides eight bit control resolution for the transition rate and brightness values. Operation begins with the EL oscillator '1' which sets the basic lamp operation frequency as before, except that it operates at a multiple of the lamp frequency as required by the counter chain. For the $V_A$ output, the EL oscillator frequency is divided by 256 in counter '2' to generate the time for a half cycle, and divided again by 2 in counter '3' to get the final 500 Hz output frequency. The resultant drive frequency then goes to the half bridge driver '4' for conversion into a high voltage square wave. The $V_B$ output is generated by a similar chain of a divide by 256 counter '5' and a divide by 2 counter '6', with the divide by 256 counter having a preset input so that it can be started at any desired initial condition. When counter '3' makes a low to high transition, it generates the preset signal for counters '5' and '6'. The value loaded into counter '5' by the preset pulse represents the desired phase delay between the low to high transition of counter '3' and counter '6'. A preset input for counter '6' causes it to be set to a low state unless the delay is zero, so that it will go high after the delay count number has been satisfied. The counter '6' output goes to half bridge driver '7' as before. Once per cycle the VA output, the counter '5' is preset to a starting position determined by its preset input when the counter chain '2' and '3' turns over to a known count. For convenience this preset generation count is chosen to be zero, although any count could be used. If the preset value for counter '6' comes from an external binary number command, then the system discussed previously in FIGS. 3 through 10 is implemented.

The additional circuitry in the dotted box may be added to provide control of the brightness transition rate. The desired rate of change for the brightness is input to the rate multiplier '8'. The rate multiplier has an average output frequency which is equal to (R+1)/256, where R is the eight bit binary number representing the desired transition rate. (R+1) is used as the control value so that the integrated circuit user cannot set the rate to zero, causing a malfunction. The count input from counter '2' controls the operation of the rate counter so it outputs the proper number of pulses for each bit position of the transition rate data input. Counter '9' provides a prescale function so that the rate of brightness change may be set to a pleasing value. This prescale function may be changed or deleted depending on the use of this circuit, and is chosen to be a divide by 32 in the present implementation. Counter '10' is used to generate a number which represents the desired lamp brightness at any particular instant, so it uses 8 bits to match the 8 bit control possible in the shown implementation of counter '5'. The contents of this counter will change a linear fashion with time until the counter value matches the external final value input. Control of the counter '10 is done by the digital comparator '11', which compares the values of the final value input '12' and the output of the bidirectional counter '10'. When the two values are equal, counter '10' is disabled so it doesn't change value. If the external final value is greater than the value of counter '10', then the comparator outputs a signal which tells the counter to move in an increasing count direction. If the final value is less, then the counter moves in a decreasing direction. The rate of counter motion is determined by the clock frequency at the counter's input, which in turn comes from the rate multiplier. In this way, the lamp brightness is caused to vary in a smooth and monotonic manner between the present value and the new desired brightness value. The number of bits in the various counters may be varied according to the desired number of brightness value possibilities and range of rates for the brightness variation.

Two methods have been presented for producing multiple channel EL lamp drivers which can independently vary the brightness of the attached El lamps. The first method uses variation of the relative phase of the two lamp terminal voltages to produce a variable duty cycle bipolar pulse waveform. This variable pulse duty cycle is then converted into a variation of the effective applied voltage across the lamp by use of the lamp capacitance and series resistance. The phase control method is capable of an arbitrarily small step size for brightness changes, permitting use of control that produces visibly imperceptible steps in the lamp brightness. An extension of this control system adds an additional counter, a digital comparator, and a rate multiplier so that the transitions from one brightness level to another may be gradual and controlled. Use of the additional circuitry permits the gradual transition to be generated without requiring active control from the controlling system. A variable brightness lamp driver without the additional circuitry could still generate the gradual transitions, but the controlling system would have to create the brightness codes and send them to the lamp driver continuously during the transition.

The second method uses selective deletion of the EL lamp driver bipolar pulse pairs to control the lamp brightness. The advantage of this method is the relative simplicity of the control circuitry, linearity of control, and ease of understanding how it works. However, limitations of the lamp operating frequency (about 500 Hz for acceptable color shift) and the pulse pattern repetition rate necessary to prevent flicker (60 Hz or more) allow only a few brightness levels. This mode does have the singular advantage that since power consumption is directly proportional to the lamp brightness, the lamp brightness may be reduced to save system overall power consumption. In user applications where a limited number of brightness level (such as 7 or 8) is acceptable, this may be the most cost effective solution. The relatively small amount of digital logic required compared to the phase shift systems of method 1 permits its implementation in processes that use coarser device features. However, the additional logic in the phase shift systems is primarily more counter bits to permit finer brightness resolution. If those systems used fewer counter bits and did not have the variable rate of change control, the logic would be more comparable.

Figure 19A:
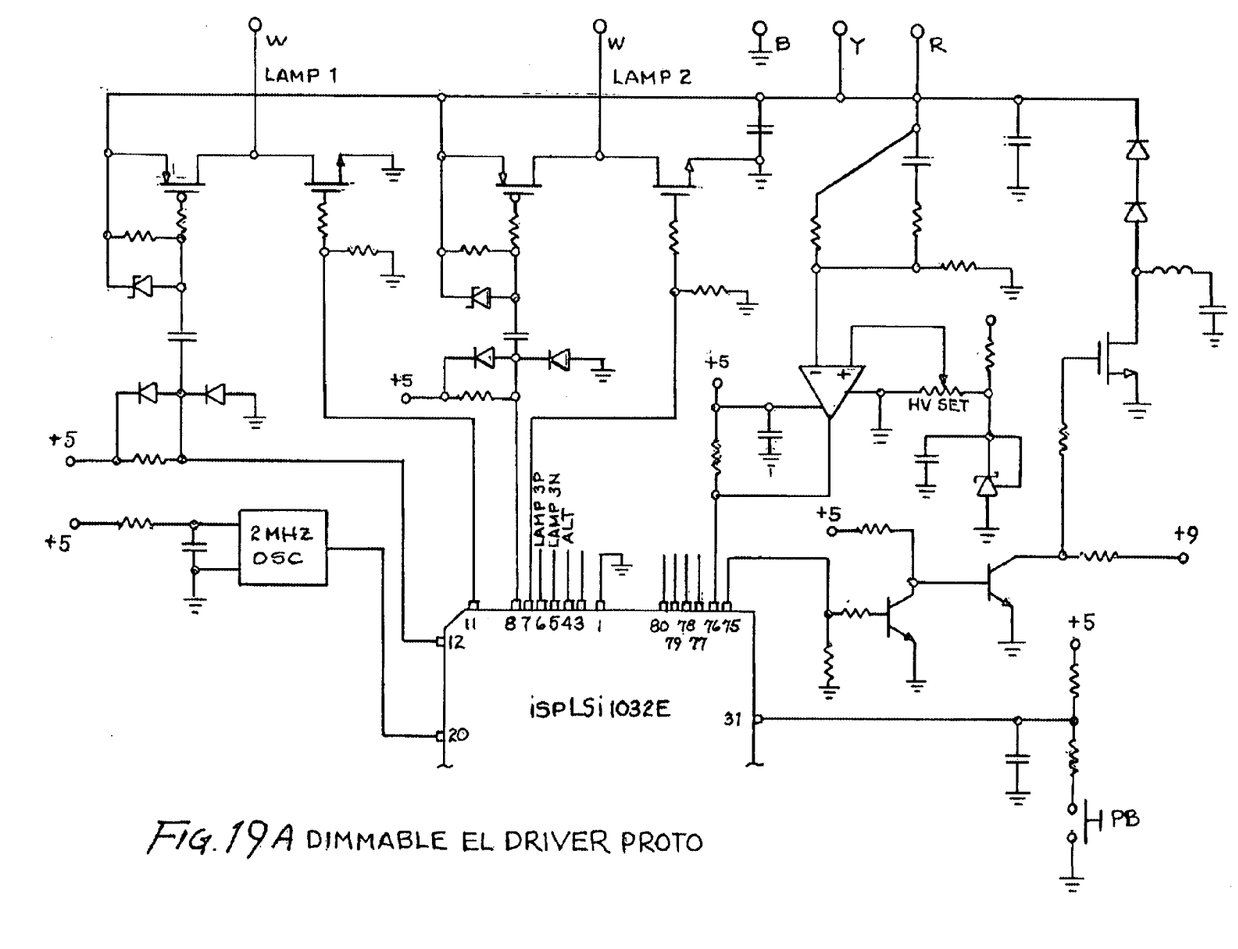
FIGS. 19A–B is a dimmable EL lamp driver prototyping board.
Figure 19B:
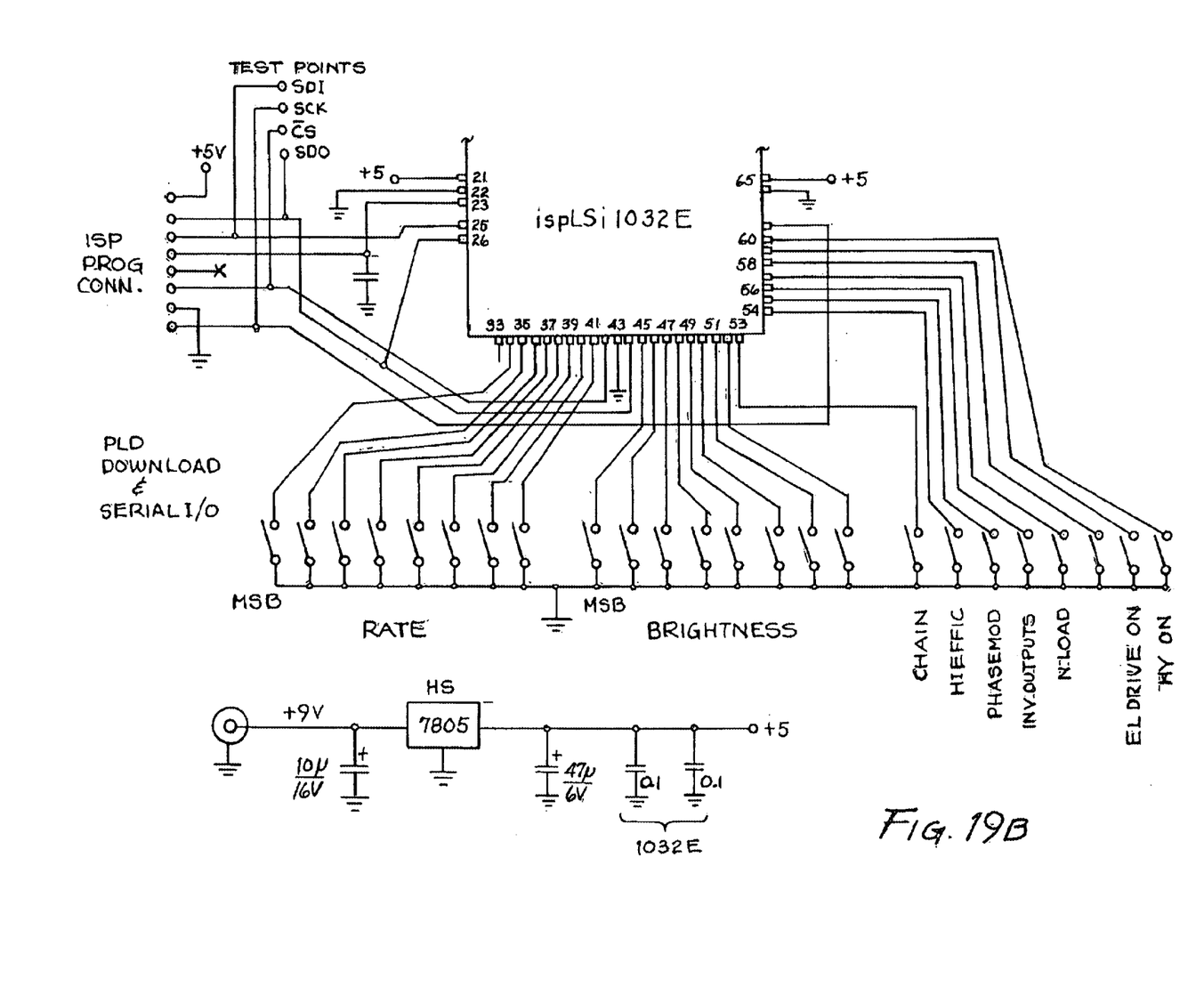

FIG. 19 shows an approximate schematic for the general purpose EL prototyping board which was made to support the experimental verification of the above design concepts and to gather the data presented above. This board has an ispLSI1032E CPLD integrated circuit made by Lattice semiconductor to contain all the digital logic needed for the system implementations. This chip has the capability of being easily reprogrammed multiple times with a simple serial data connection which connects via a special cable to the parallel printer port of a standard IBM compatible PC. A crystal oscillator module at 2 MHz provides the basic clock for all operation, and a set of DIP switches allows inputting logic variables as desired.

Three high voltage outputs are generated with half-bridge driver circuits so that the logic signals may be translated into the high voltage levels needed to drive an EL lamp. For simplicity the top PMOS transistor in each half-bridge is driven by AC coupled signals. This works satisfactorily since the high voltage outputs basically generate a 500 Hz related wave at all times.

High voltage for the El lamp excitation is simply generated by a boost converter operating 125 kHz. This is implemented with a high voltage NMOS transistor use to periodically connect a 110 microhenry inductor to ground. When the transistor turns off, the inductive flyback causes the generation of a high voltage spike, which charges a filter capacitor. A simple voltage reference and comparator determine when the high voltage has reached the desired value, and stops the pulse generation. The converter continues to run in a burst mode, outputting pulses whenever needed to maintain the high voltage value. Buffers in the gate circuit to the NMOS transistor provide additional gate voltage drive to reduce its on resistance.

The schematic only shows two of the three half-bridge outputs due to drawing space. The one not drawn is used to drive the red binding post for use as the common EL terminal. A fourth driver for demonstrating the triple EL lamp driver logic is not implemented, although the signal required is output on the auxiliary test point TP4 for examination with scope. All circuitry is powered with a simple regulated 9 volt power adapter module plugged into the power line, and a three terminal 5 volt regulator is used to power the CPLD and most circuitry.

The logic content of the CPLD was rewritten as required to test various logic configurations and modes of operation. This also permitted easy debugging of the logic operation using a dynamic method with an oscilloscope. The logic diagram for the CPLD typically takes up many pages and is not replicated here.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method for dimmable control of a multiple output EL lamp driver having a power converter, a plurality of EL lamps wherein one terminal of the EL lamps is coupled to a single common terminal, a plurality of half bridge circuits each having an output impedance wherein one half bridge circuit is coupled to the single common terminal and each remaining terminal of each EL lamp is coupled to a separate individual half bridge circuit, a logic circuit coupled to each of the half bridge circuits, and an oscillator coupled to the logic circuit comprising:

minimizing the output impedance of the half bridge circuit coupled to the single common terminal to prevent brightness crosstalk between EL lamps;

selecting output impedances of remaining half bridge circuits to produce rounded waveforms across terminals of the EL lamps;

manipulating a drive waveform of one of the plurality of EL lamps to control brightness.

2. The method of claim 1 wherein the step of manipulating a drive waveform comprises controlling a phase shift of the drive waveform to control brightness.

3. The method of claim 2 further comprising varying a phase shift of the drive waveform by a digital counter.

4. The method of claim 2 further comprising varying a phase shift of the drive waveform by an analog device.

5. The method of claim 1 wherein selecting output impedances of remaining half bridge circuits further comprises selecting output impedances of remaining half bridge circuits by using a resistor in series with the half bridge circuit and the EL lamps.

6. The method of claim 1 wherein selecting output impedances of remaining half bridge circuits further comprises selecting output impedances of remaining half bridge circuits by selecting a transistor of a suitable size for the half bridge circuits to limit and control output current characteristics.

7. The method of claim 1 wherein selecting output impedances of remaining half bridge circuits further comprises selecting output impedances of remaining half bridge circuits by using an analog control circuit to predetermine output current characteristics of the half bridge circuits.

8. The method of claim 1 wherein selecting output impedances of remaining half bridge circuits to produce rounded waveforms across terminals of the EL lamps further comprises providing output impedances of approximately 33,000 ohms.

9. The method of claim 1 wherein the step of manipulating a drive waveform comprises controlling a relative phase of predetermined cycles of the drive waveform to control brightness.

10. The method of claim 9 wherein controlling a relative phase of predetermined cycles of the drive waveform to control brightness further comprises uses a binary code to control the predetermined cycles.

11. The method of claim 9 further comprising using a binary code to gate the predetermined cycle positions of the drive waveform to control brightness.

12. The method of claim 1 wherein the step of manipulating a drive waveform comprises controlling a phase shift of the drive waveform to control brightness.

13. The method of claim 12 further comprising varying the phase shift of the drive waveform by a digital counter.

14. The method of claim 12 further comprising varying the phase shift of the drive waveform by an analog counter.

15. A method for dimmable control of an output EL lamp driver having a power converter, an EL lamp, a plurality of half bridge circuits each having an output impedance wherein the first half bridge circuit is coupled to first terminal of the EL lamp and a second terminal of the EL lamp is coupled to second half bridge circuit, a logic circuit coupled to the first and second half bridge circuits, and an oscillator coupled to the logic circuit comprising:
  minimizing the output impedance of the first half bridge circuit coupled to the first terminal to prevent to brightness crosstalk;
  selecting output impedance of second half bridge circuit to produce rounded waveforms across terminals of the EL lamp;
  manipulating a drive waveform of the EL lamp to control brightness.

16. The method of claim 15 wherein the step of manipulating a drive waveform comprises controlling a phase shift of the drive waveform to control brightness.

17. The method of claim 16 wherein controlling the phase shift of the drive waveform further comprises controlling the phase shift by a digital counter.

18. The method of claim 16 wherein controlling the phase shift of the drive waveform further comprises controlling the phase shift by an analog device.

19. The method of claim 17 further comprising a second digital counter for producing the drive waveform phase shift.

20. The method of claim 19 further comprising providing a variable means for controlling a rate of change of the second digital counter for producing the drive waveform phase shift.

21. The method of claim 20 further comprising using a digital rate multiplexer as the variable means.

22. The method of claim 19 further comprising providing a digital comparator to control a final phase shift counter value after a transition.

23. The method of claim 18 further comprising providing variable means for controlling a rate of change of the analog device, the voltage of the analog device represents a produced drive waveform phase shift.

* * * * *